A. B. RAMSEY.
SCISSORS.
APPLICATION FILED MAY 3, 1910.
967,436.
Patented Aug. 16, 1910.
Fig. 1.
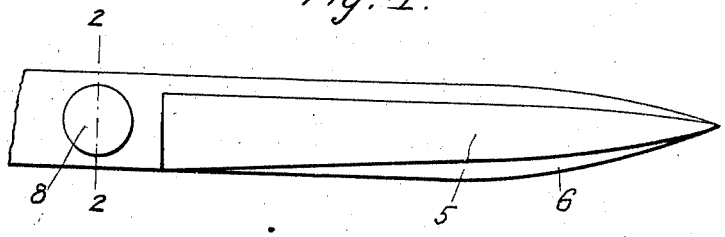
Fig. 2.
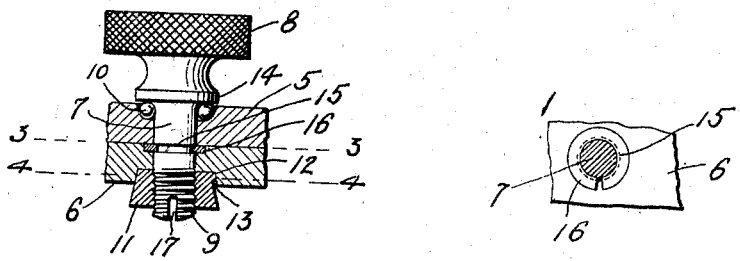
Fig. 3.
Fig. 4.
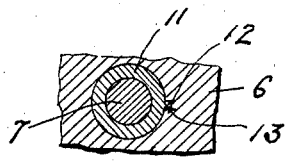
Witnesses
Jennie Kuly
A. E. Schmidt
Inventor
Annie B. Ramsey
By Max A. Schmidt
Attorney

UNITED STATES PATENT OFFICE.

ANNIE BELL RAMSEY, OF DAVIS, OKLAHOMA.

SCISSORS.

967,436.  Specification of Letters Patent.  Patented Aug. 16, 1910.

Application filed May 3, 1910. Serial No. 559,061.

*To all whom it may concern:*

Be it known that I, ANNIE B. RAMSEY, a citizen of the United States, residing at Davis, in the county of Murray and State of Oklahoma, have invented certain new and useful Improvements in Scissors, of which the following is a specification.

This invention relates to scissors, shears and similar cutting devices, and its object is to provide an improved pivotal connection whereby the blades will be made to work free and easy, and also to provide a pivotal connection which will not work loose, and which is easily adjusted.

With these objects in view, the invention consists in a novel construction and arrangement of parts to be hereinafter described and claimed, and in order that the invention may be better understood, reference is had to the accompanying drawing, in which—

Figure 1 is a plan view of a portion of a pair of scissors provided with my improved pivotal connection. Fig. 2 is an enlarged section on the line 2—2 of Fig. 1. Fig. 3 is a section on the line 3—3 of Fig. 2. Fig. 4 is a section on the line 4—4 of Fig. 2.

Referring specifically to the drawing, the two blades of the scissors are indicated at 5 and 6, respectively, each blade having a pivot opening through which the pivot stud 7 passes. On one end of the pivot stud is a knurled head 8, and its other end is screw-threaded as indicated at 9. The outer end of the pivot opening of the blade 5 is countersunk to form a raceway for an annular series of anti-friction balls 10. The outer end of the pivot opening of the blade 6 has a tapered countersink in which seats a nut 11, into which the threaded end 9 of the pivot stud screws. The nut is tapered to fit snugly in the countersink, and has on one side a key 12 which seats in a keyway 13 made in the wall of the countersink, whereby rotation of the nut is prevented.

The pivot stud 7, adjacent to the head 8, and one the outside of the blade 5, is formed with an annular shoulder 14, which is in contact with the balls 10, and serves to retain the same in their raceway. The balls extend sufficiently from the raceway so that the shoulder may engage them without coming into contact with the blade. That portion of the shoulder which engages the balls is rounded off to provide a proper bearing surface.

Intermediate its ends, the pivot stud 7 has an annular groove 15 in which seats a ring 16, said ring being split so that it may be placed in the groove. The ring forms an annular collar on the pivot stud, said shoulder seating in a countersink made in the inner end of the pivot opening of the blade 6. The threaded end 9 of the pivot stud is split longitudinally as indicated at 17, so that this portion of the stud may be spread sidewise to bind the threads of the nut 11 with sufficient tightness to prevent the latter from working loose.

In assembling the parts, the balls are placed in the raceway, and the pivot stud is passed through the pivot opening in the blade 5. The ring 16 is then applied, which prevents the balls from dropping from the raceway, said ring engaging the inner face of the blade. The nut 11 is now placed in the countersink of the pivot opening of the blade 6, the key 12 being properly seated in the keyway 13. The threaded portion of the pivot stud is then passed through the pivot opening of the blade 6, and screwed into the nut, after which the split portion of the stud is spread for the purpose already described. The pivot stud may now be adjusted so that the blades work with the desired degree of freeness and ease, which completes the operation. The ring 16 is loose on the pivot stud so as not to interfere with the manipulation of the latter to effect the adjustment. A slight turn of the pivot screw in one direction draws the blades together to tighten the joint, and a turn in the opposite direction backs them and loosens the joint. The ring 16 is flush with the contiguous faces of the two blades, which permits them to be drawn closely together.

By the pivotal connection herein described the blades cannot work loose, or become so tight as to necessitate the use of tools to effect adjustment, and the balls give the blades a free and easy movement. Adjustment for thick heavy goods, and for the most delicate fabrics can be readily made by giving the pivot stud a slight turn.

I claim:

Scissors or the like comprising blades having pivot openings, each of said openings having a countersink in its outer end, and the pivot opening of one blade having a countersink in its inner end, a pivot stud passing through the openings, a collar on the pivot stud seating in the last-mentioned countersink, and having its outer surface flush with the contiguous surfaces of the blades, a shoulder on the pivot stud, a nut into which the pivot stud screws, the shoulder being opposite one of the outer countersinks, and the nut being non-rotatably seated in the other outer countersink, and anti-friction balls in the countersink which is opposite the shoulder, said balls being engageable by the shoulder.

In testimony whereof I affix my signature in presence of two witnesses.

ANNIE BELL RAMSEY.

Witnesses:
O. C. FRANCIS,
CHAS. WILLIS.